(12) United States Patent
Koelzer et al.

(10) Patent No.: US 10,851,848 B2
(45) Date of Patent: Dec. 1, 2020

(54) SYCHRONIZER UNIT FOR A MANUAL TRANSMISSION, AND MANUAL TRANSMISSION

(71) Applicant: HOERBIGER ANTRIEBSTECHNIK HOLDING GMBH, Schongau (DE)

(72) Inventors: Michael Koelzer, Rosshaupten (DE); Juergen Binder, Schongau (DE); Peter Echtler, Schongau (DE); Wolfgang Voelk, Hohenfurch (DE)

(73) Assignee: HOERBIGER ANTRIEBSTECHNIK HOLDING GMBH, Schongau (DE)

( * ) Notice: Subject to any disclaimer, the term of this patent is extended or adjusted under 35 U.S.C. 154(b) by 400 days.

(21) Appl. No.: 15/788,849

(22) Filed: Oct. 20, 2017

(65) Prior Publication Data

US 2018/0112721 A1 Apr. 26, 2018

(30) Foreign Application Priority Data

Oct. 20, 2016 (DE) .......................... 10 2016 120 007

(51) Int. Cl.
*F16D 23/06* (2006.01)
*F16D 23/02* (2006.01)

(52) U.S. Cl.
CPC ........... *F16D 23/06* (2013.01); *F16D 23/025* (2013.01); *F16D 2023/0631* (2013.01); *F16D 2023/0637* (2013.01)

(58) Field of Classification Search
CPC .................. F16D 23/06; F16D 23/025; F16D 2023/0631; F16D 2023/0637; F16D 2023/0656

(Continued)

(56) References Cited

U.S. PATENT DOCUMENTS 2,488,044 A * 11/1949 Voight .................... F16D 23/08
192/53.34
3,631,952 A 1/1972 Sugimoto et al.
(Continued)

FOREIGN PATENT DOCUMENTS

CN 101395396 A 3/2009
CN 203879958 U 10/2014
(Continued)

*Primary Examiner* — Richard M Lorence
(74) *Attorney, Agent, or Firm* — McNees Wallace & Nurick LLC

(57) ABSTRACT

A synchronizer unit for a manual transmission, in particular of a motor vehicle, has a hub which is adapted to be connected to a gear shaft for joint rotation therewith and includes a circumferentially continuous external toothing, a sliding sleeve which is received on the external toothing of the hub for displacement in the axial direction, but so as to be coupled in the circumferential direction to prevent relative rotation, at least one synchronizer ring which includes a preferably cone-shaped friction surface for friction coupling of the synchronizer ring to a speed change gear of the manual transmission and is adapted to be actuated by the sliding sleeve, and a spring ring which is arranged at an axial side of the external toothing of the hub and is configured to lock the sliding sleeve in a neutral position. The spring ring rests against a face side of the sliding sleeve and being operatively arranged between the sliding sleeve and the synchronizer ring.

19 Claims, 13 Drawing Sheets

(58) Field of Classification Search
USPC .......................................... 192/53.34–53.343
See application file for complete search history.

(56) References Cited

U.S. PATENT DOCUMENTS

| | | | | |
|---|---|---|---|---|
| 4,776,228 | A | * | 10/1988 | Razzacki ................ F16D 23/06 |
| | | | | 192/53.34 |
| 4,830,158 | A | * | 5/1989 | Uno ........................ F16D 23/06 |
| | | | | 192/53.34 |
| 5,105,927 | A | * | 4/1992 | Frost ....................... F16D 23/06 |
| | | | | 192/53.31 |
| 5,620,075 | A | | 4/1997 | Larsen et al. |
| 6,533,091 | B1 | | 3/2003 | Kawada et al. |
| 2011/0226076 | A1 | | 9/2011 | Renner |
| 2017/0146074 | A1 | * | 5/2017 | Fuerguth .................. B24B 1/04 |

FOREIGN PATENT DOCUMENTS

| | | |
|---|---|---|
| CN | 104265793 A | 1/2015 |
| DE | 2030619 A1 | 2/1971 |
| DE | 2331053 A1 | 1/1975 |
| DE | 3225201 A1 | 1/1984 |
| DE | 10 2006 023 098 B3 | 8/2007 |

\* cited by examiner

SYCHRONIZER UNIT FOR A MANUAL TRANSMISSION, AND MANUAL TRANSMISSION

The invention relates to a synchronizer unit for a manual transmission of a motor vehicle and to a manual transmission having such a synchronizer unit.

BACKGROUND OF THE INVENTION

In modern manual transmissions as are used in particular in motor vehicles, each gear ratio step is formed by two meshing gearwheels. One of the gearwheels is arranged on a gear shaft for joint rotation therewith, and the other gearwheel is rotatably arranged on the second gear shaft in the form of a so-called movable gear. The movable gear can then be connected with this gear shaft for joint rotation therewith when the respective gear is engaged.

When the gear is engaged, the synchronizer unit serves to adjust the speed of the movable gear to the speed of the gear shaft to which it is to be coupled for joint rotation.

Irrespective of the particular specific configuration of the synchronizer unit, the synchronization process usually consists in that when the sliding sleeve is moved out of a neutral position in order to shift a gear, in a so-called pre-synchronizing phase at first a synchronizer ring is urged against a friction surface associated with it. The synchronizer ring rotates together with a hub on which the sliding sleeve is received, and the friction surface is connected for joint rotation with the speed change gear to be shifted. The friction torque makes sure that the speed of the speed change gear is adjusted to the speed of the synchronizer ring and therefore to the speed of the hub and also to that of the gear shaft.

Once the speeds of the speed change gear and of the gear shaft have been adjusted, the sliding sleeve can be shifted through, so that the speed change gear is coupled to the gear shaft for joint rotation via the sliding sleeve and the hub.

One example of such a synchronizer unit is known as "Borg-Warner synchronization".

The object of the invention is to provide a synchronizer unit that distinguishes itself by a very small installation space, in particular in the axial direction.

BRIEF DESCRIPTION OF THE INVENTION

To achieve this object, according to the invention provision is made for a synchronizer unit for a manual transmission, in particular of a motor vehicle, including a hub which is adapted to be connected to a gear shaft for joint rotation therewith and includes a circumferentially continuous external toothing, a sliding sleeve which is received on the external toothing of the hub for displacement in the axial direction, but so as to be coupled in the circumferential direction to prevent relative rotation, at least one synchronizer ring which includes a preferably cone-shaped friction surface for friction coupling of the synchronizer ring to a speed change gear of the manual transmission and is adapted to be actuated by the sliding sleeve, and a spring ring which is arranged at an axial side of the external toothing of the hub and is configured to lock the sliding sleeve in a neutral position, the spring ring resting against a face side of the sliding sleeve and being operatively arranged between the sliding sleeve and the synchronizer ring. The spring ring here serves as a pre-synchronizer element, similar to thrust pieces which in known synchronizer units serve to transfer an axial movement of the sliding sleeve to the synchronizer ring and to press the latter against the friction surface associated with it. But since the spring ring is positioned in the region of the face side of the sliding sleeve, it is possible to design the external toothing of the hub to be continuous in the circumferential direction. This increases the strength of the hub and the capability of the external toothing to transmit a torque. This allows the hub to be configured to be axially more compact.

In this connection, the term "face side of the sliding sleeve" is understood to mean an axially facing surface. The surface involved need not necessarily be one of the surfaces that are located the farthest out in the axial direction. It also need not be a surface that is oriented perpendicularly to the center axis of the sliding sleeve and thus to the center axis of one of the gear shafts.

The synchronizer unit according to the invention may be used with one single synchronizer ring per speed change gear. If higher torques are to be transmitted during synchronization, multi-surface synchronizer ring assemblies may also be used as are basically known from the prior art.

Preferably, it is provided that the spring ring is a reshaped sheet metal ring. This allows the desired spring properties to be realized involving very small dimensions in the axial direction. In particular, the dimensions that can be realized are very much smaller than is possible when a spring ring made of wire is used.

The spring ring preferably is circumferentially interrupted so that it is resilient in the radial direction. In addition, this makes assembly easier.

According to one configuration of the invention, provision is made that in the neutral position of the sliding sleeve, the spring ring rests against an internal toothing of the sliding sleeve, preferably against a pre-synchronizer chamfer of the internal toothing. In this way, it is ensured that the spring ring will not impair the engagement between the sliding sleeve and the blocking teeth of the synchronizer ring. The spring ring may serve as a pre-synchronizer element here, similar to a thrust piece.

According to one configuration of the invention, provision is made that the internal toothing of the sliding sleeve is circumferentially continuous. This also increases the capability of transferring a torque from the hub to the sliding sleeve.

According to one configuration of the invention, the spring ring includes a plurality of guide steps by means of which it is guided at the hub in the axial direction and in the circumferential direction. The guide steps, which are formed, for example, as a circumferential, reshaped guide collar or as axially extending guide tabs, prevent the spring ring from expanding radially in an undesirable manner under the action of centrifugal forces.

Preferably, the spring ring comprises two or more substantially axially extending spring shackles which each engage in a recess provided in the hub. The spring shackles prevent the spring ring from rotating relative to the hub in an undesirable manner.

The spring shackles may comprise a portion that is bent or angled radially outward, by which the spring ring can be coupled to the hub in the axial direction.

Preferably, in the neutral position, the spring shackle rests against a spring ring holding surface of the hub, the spring ring holding surface preferably being arranged on a radially external side face of the recess and/or preferably extending at an angle in relation to an axial plane of the hub. In this configuration, the spring shackle also serves to act upon the spring ring in the axial direction in the initial position thereof, in which it rests against the face side of the hub.

The spring shackle may engage behind the spring ring holding surface in the axial direction, so that a good axial coupling is ensured.

According to a preferred embodiment of the invention, two spring rings are provided which are arranged on axially opposite sides of the hub. This results in a symmetrical structure in a synchronizer unit that is used for synchronizing two speed change gears.

The spring rings may be arranged offset in relation to each other, so that they do not contact each other. There is therefore no reaction or feedback from the spring ring of one side to the spring ring of the other side.

Alternatively, provision may be made that the spring shackles of the spring rings arranged on axially opposite sides rest radially against each other in pairs. In this configuration, the assembly formed from the two spring rings jointly is fixed in place relative to the hub.

In particular, it is provided here that the spring rings resting against each other in pairs engage behind each other in the axial direction. This results in a very simple assembly since the two spring rings automatically lock onto each other.

According to one embodiment of the invention, provision is made that the synchronizer ring is provided with index cams which are arranged radially within the outer contour. This ensures a toothing of the hub that is fully closed in the circumferential direction.

According to one configuration of the invention, provision is made that the hub has at least one further recess for receiving the index cams, so that they are precisely guided relative to the hub in the circumferential direction.

According to a preferred embodiment of the invention, a synchronizer assembly having a synchronizer ring and an additional synchronizer ring is provided, the synchronizer ring being provided with at least one index cam which has a recess having a coupling extension received therein which is mounted to the additional synchronizer ring. This increases the size of the friction surfaces available for transferring a torque between the hub and the coupling ring.

Preferably, the additional synchronizer ring is provided with at least one coupling cam which engages in a pocket provided at the hub. This allows a torque to be transferred directly from the additional synchronizer ring into the hub in the pre-synchronizing phase, without the synchronizer ring being acted upon. The latter can therefore rotate to the blocking position in an optimum way, in which it prevents the sliding sleeve from shifting through.

The recess in which the index cam engages may be configured as a closed, pocket-like cutout, so that the strength of the recess is increased.

BRIEF DESCRIPTION OF THE DRAWINGS

The invention will be described below with reference to various embodiments which are illustrated in the accompanying drawings, in which.

DETAILED DESCRIPTION OF THE INVENTION

A first embodiment of the invention will be described below with reference to FIGS. 1 to 11.

Figure 1:
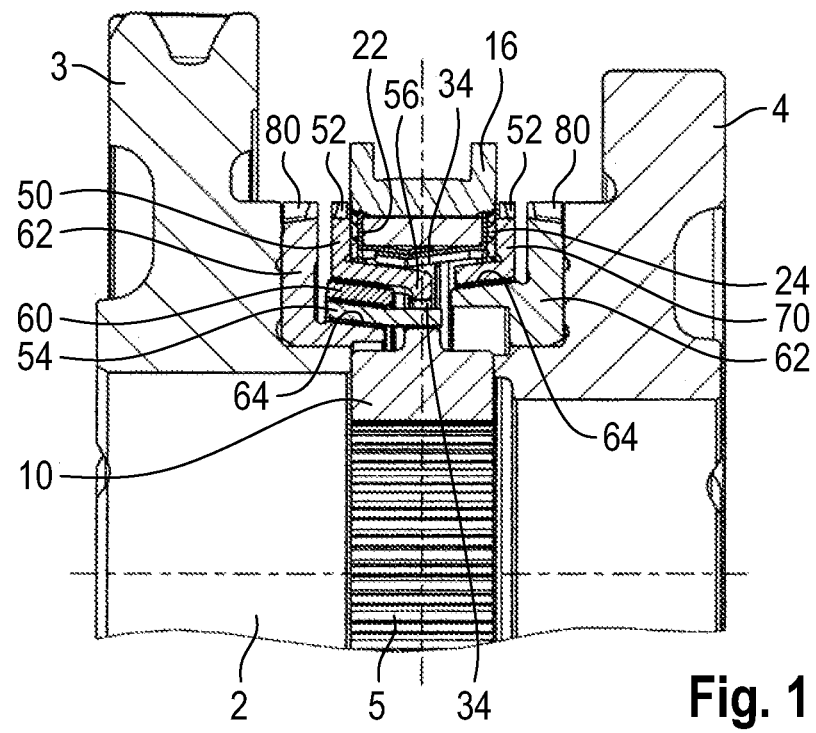
FIG. 1 shows a synchronizer unit according to the invention in a schematic section along the plane I-I of FIG. 5, with a multi-surface synchronizer ring assembly being shown for synchronization of the left-hand speed change gear shown in FIG. 1, and a synchronizer ring having one single friction surface being shown for synchronization of the right-hand speed change gear.
Figure 2:
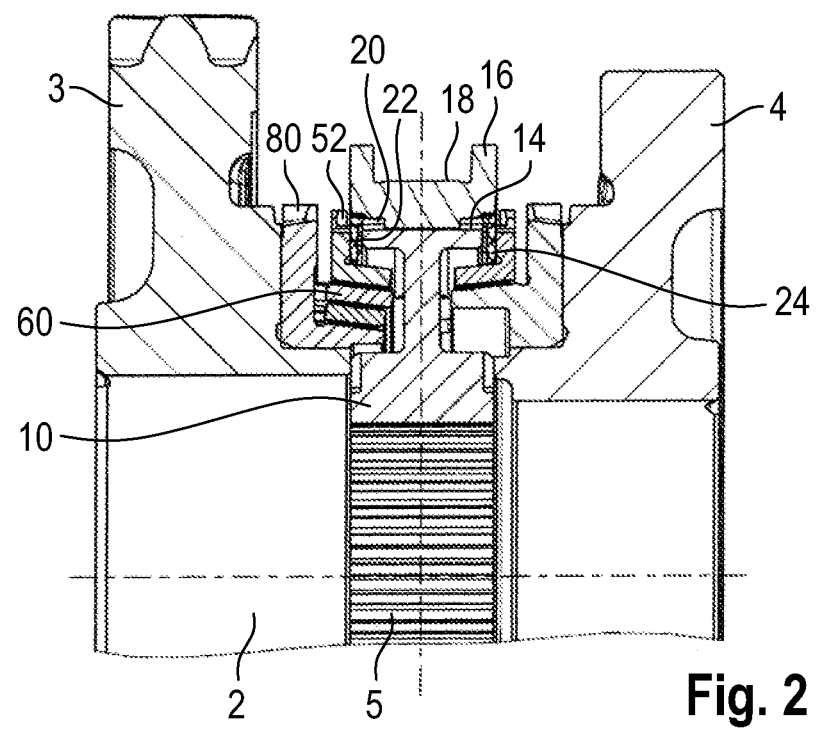
FIG. 2 shows the synchronizer unit of FIG. 1 in a section along the plane II-II of FIG. 5.
Figure 3:
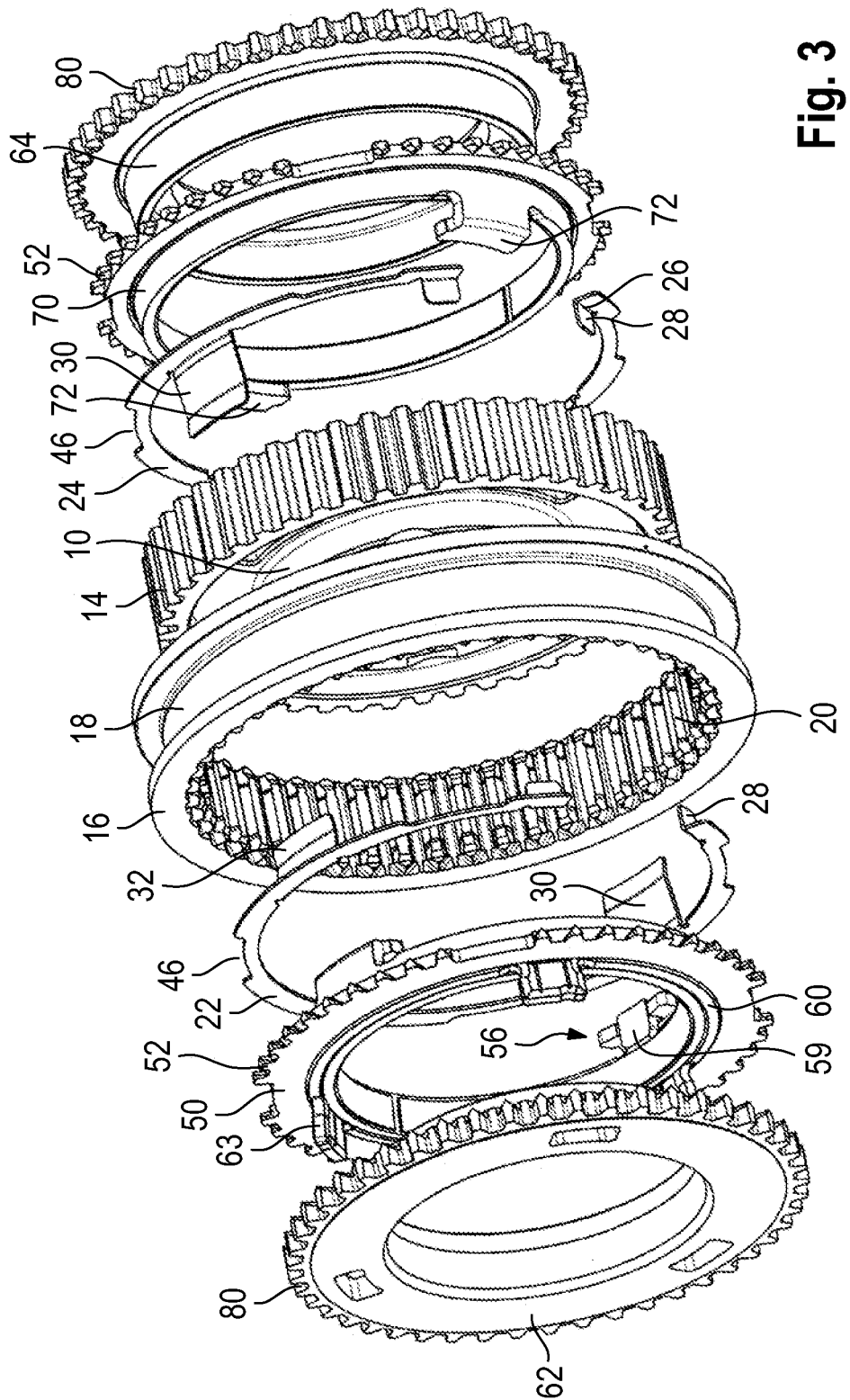
FIG. 3 shows an exploded view of the synchronizer unit of FIG. 1.
Figure 4:
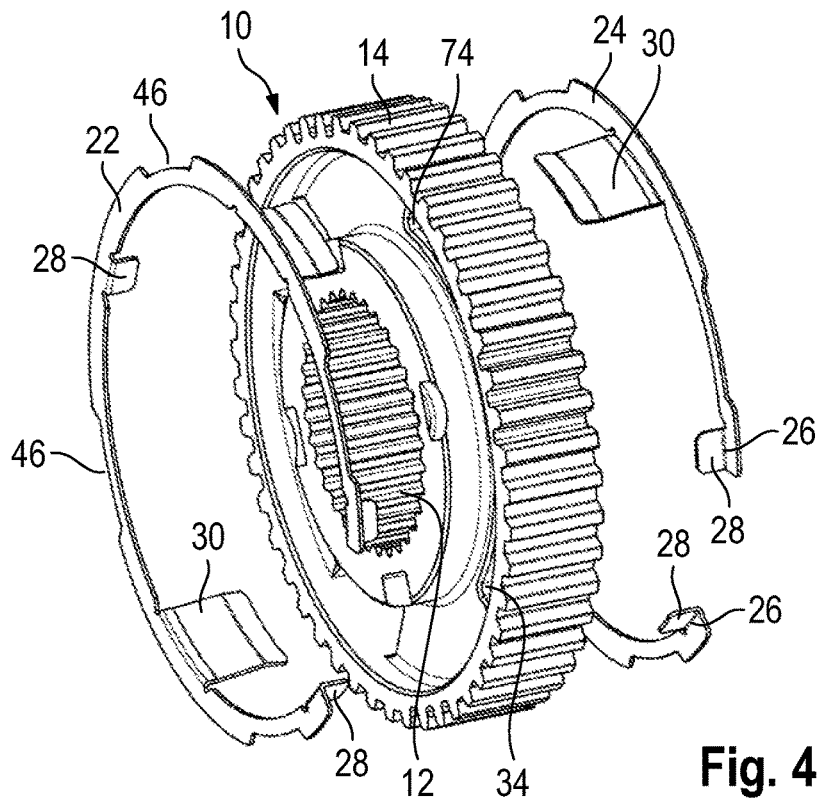
FIG. 4 shows an exploded view of the hub as used in the synchronizer unit of FIG. 1 and having two spring rings.

FIGS. 1 and 2 show a gear shaft 2 having two speed change gears 3, 4 in the form of movable gears arranged thereon. To shift the appropriate gear, they can be connected to the gear shaft 2 for joint rotation therewith. The connection for joint rotation is effected by means of a hub 10 arranged on the gear shaft 2 for joint rotation therewith. For this purpose, the gear shaft 2 is provided with a gear shaft toothing 5 having the hub 10 mounted thereon so as to prevent relative rotation in the circumferential direction and so as to be axially fixed.

The hub 10 has an inner surface that is provided with a hub toothing 12 engaging with the gear shaft toothing 5 of the gear shaft 2. The hub 10 has an outer surface provided with an external toothing 14.

The external toothing 14 is continuous in the circumferential direction. In this context, "continuous in the circumferential direction" means that the external toothing 14 is not interrupted to receive any further components. It is not detrimental in this connection if some tooth or other is possibly formed with a different geometry or is omitted altogether. What is decisive with a view to the capability of transferring a high torque is the fact that the material ring carrying the external toothing 14 is continuous below the root diameter of the toothing.

Arranged on the external toothing 14 of the hub 10 is a sliding sleeve 16 which is provided with a shift fork groove 18 on its outside. The shift fork (not illustrated here) allows the sliding sleeve 16 to be adjusted in the axial direction in order to shift the respective gear (that is, relating to FIGS. 1 and 2, to the left to engage the gear with the speed change gear 3, and to the right to engage the gear with the speed change gear 4).

On its inner surface, the sliding sleeve 16 is provided with an internal toothing 20 or sliding sleeve toothing which is adapted to the external toothing 14 of the hub 10 such that the sliding sleeve 16 is received on the hub 10 for joint rotation therewith in the circumferential direction, but can be displaced relative thereto in the axial direction.

Figure 6:
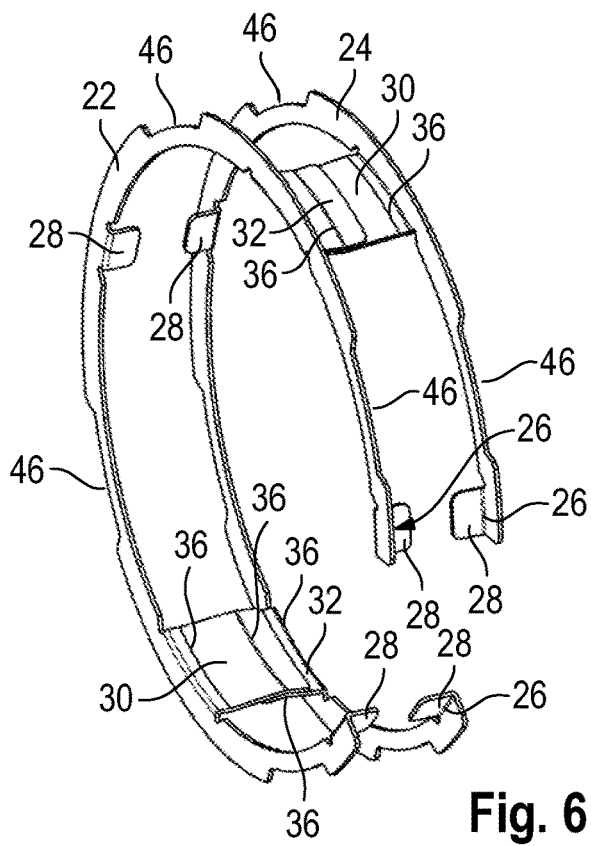
FIG. 6 shows the two spring rings of FIG. 4 in a condition mounted to each other.
Figure 7:
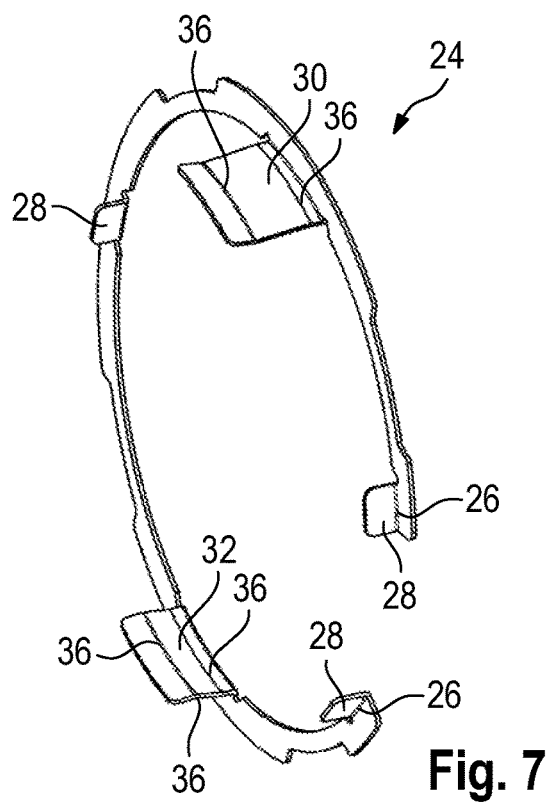
FIG. 7 shows a perspective view of one of the spring rings of FIG. 4.
Figure 8:
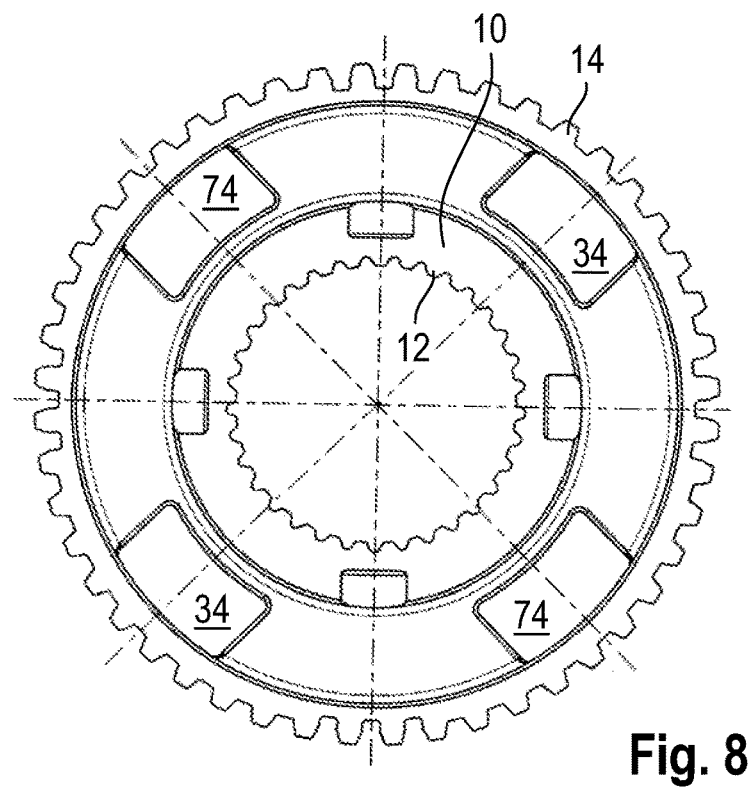
FIG. 8 shows a top view of the hub of FIG. 4.
Figure 9:
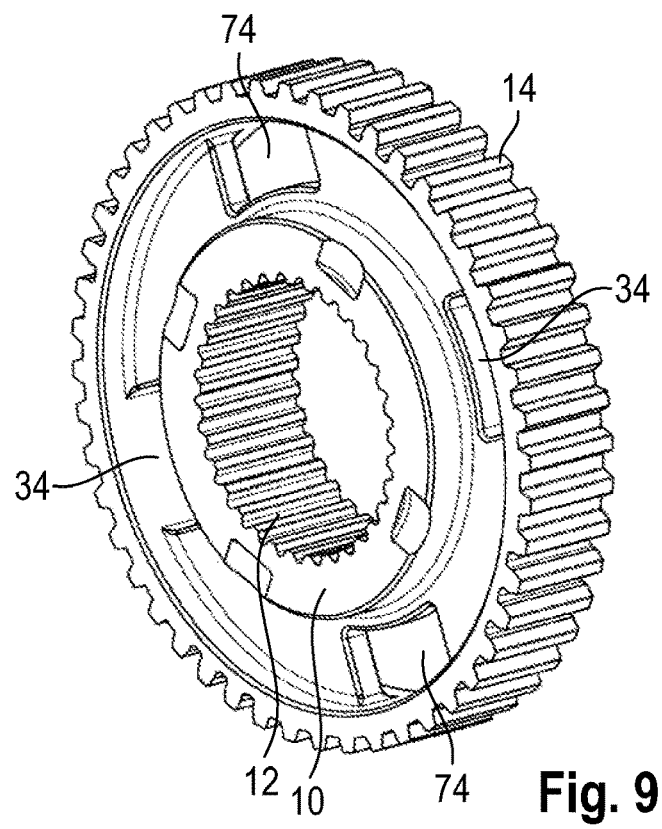
FIG. 9 shows a perspective view of the hub.
Figure 10:
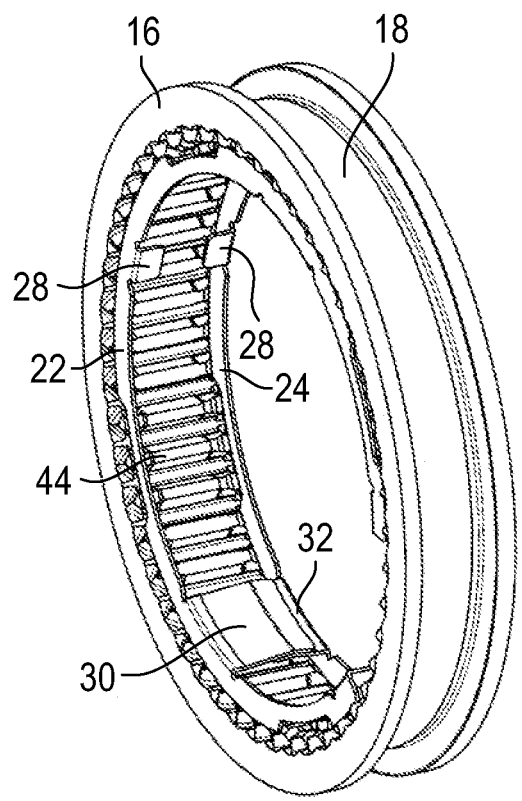
FIG. 10 shows a perspective view of the sliding sleeve as used in the synchronizer unit of FIG. 1, with the two spring rings attached thereto.
Figure 11:
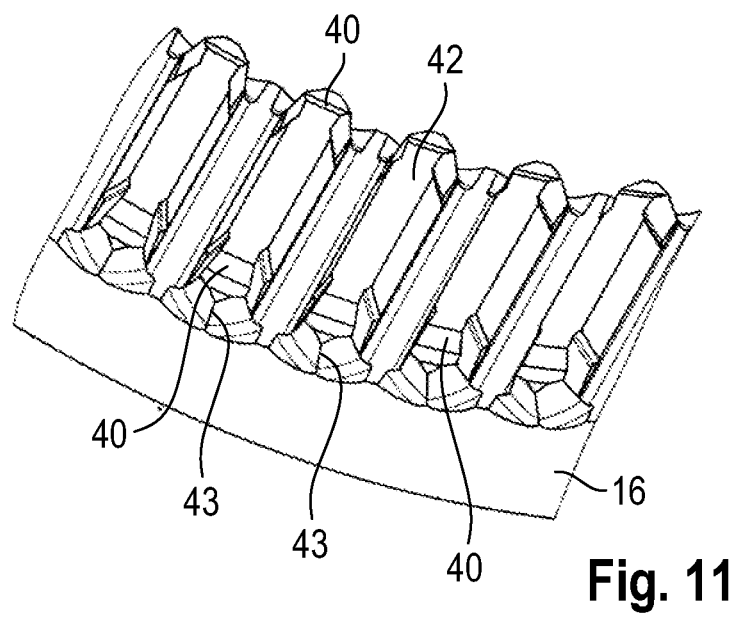
FIG. 11 shows an enlarged, perspective view of the internal toothing of the sliding sleeve of FIG. 10.
Figure 12:
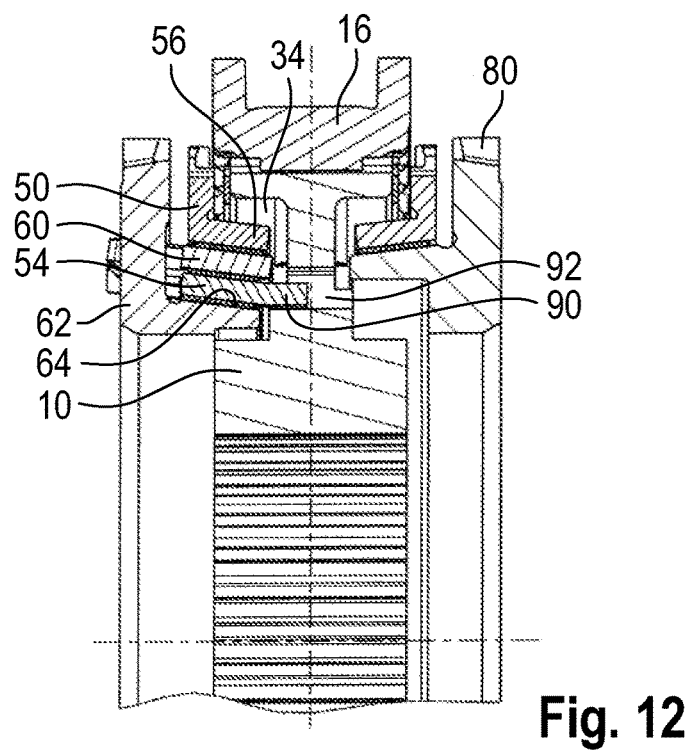
FIG. 12 shows a synchronizer unit according to a first variant embodiment, in a sectional view corresponding to that of FIG. 1.
Figure 13:
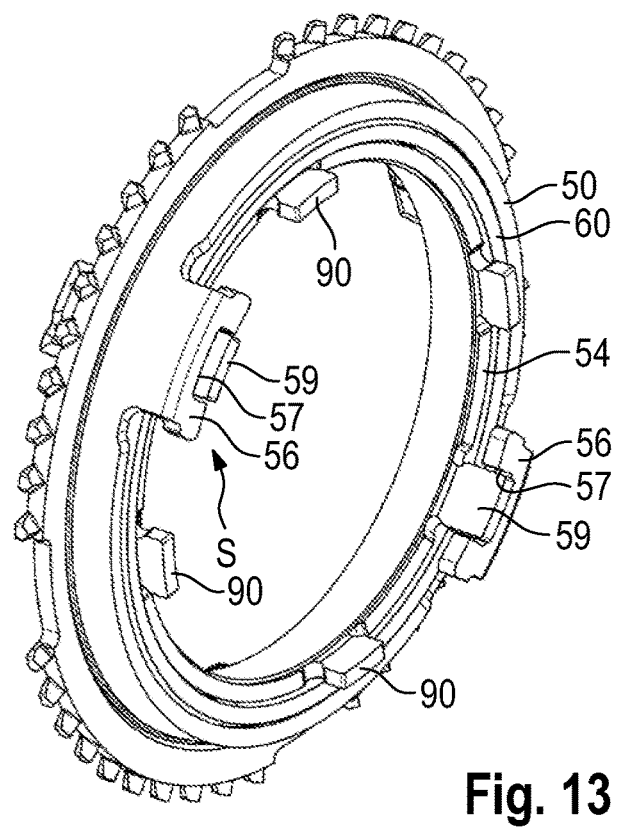
FIG. 13 shows a perspective view of the synchronizer assembly used in the first variant embodiment.

Arranged on either side of the hub 10 is a respective spring ring 22, 24, which will be discussed in detail in particular with reference to FIGS. 6 and 7.

Each spring ring 22, 24 is made of sheet metal, in particular of a spring steel sheet. The parts involved are stamped-out bent sheet metal parts.

Each spring ring 22, 24 is formed with a slit here, i.e. interrupted in the circumferential direction.

Each spring ring includes a plurality of guide steps 26, by means of which it is guided at the hub 10 in the axial direction and in the circumferential direction. In the exemplary embodiment of FIGS. 6 and 7, each spring ring 22, 24 is provided with a plurality of substantially axially extending guide tabs 28 which, together with the transition to the spring ring proper, form the respective guide step 26.

In addition, each spring ring 22, 24 is provided with a plurality of substantially axially extending spring shackles 30, 32, which extend through recesses 34 in the hub 10 (see also FIGS. 8 and 9) and snap into each other.

Each spring ring 22, 24 is provided with one longer spring shackle 30 and one shorter spring shackle 32 here, which are arranged opposite each other, each spring shackle being slightly angled or bent radially (see the bending edges 36) such that the spring shackles 30, 32 lock elastically into one another when the spring rings 22, 24 are mounted to the hub 10.

Figure 5:
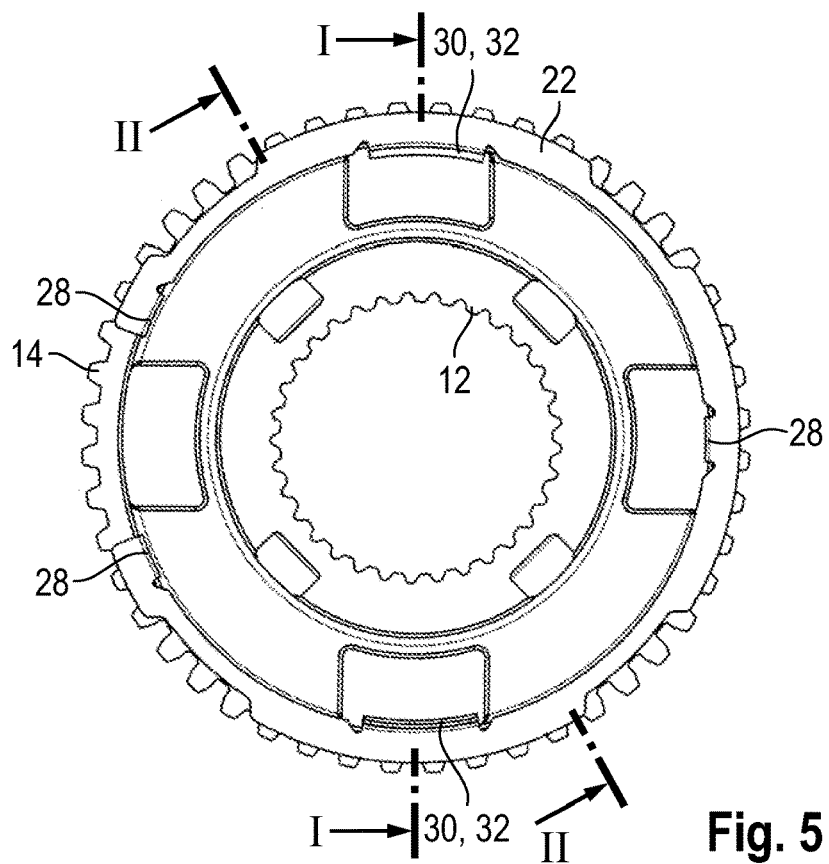
FIG. 5 shows a top view of the hub as used in the synchronizer unit of FIG. 1, with spring rings attached thereto.

As can be seen in particular in FIG. 5, the outside diameter of the spring rings 22, 24 is selected such that the maximum diameter of the spring rings 22, 24 in the mounted condition is between the root diameter and the tip diameter of the external toothing 14 of the hub 10.

Because of their outside diameter, the spring rings 22, 24 are positioned opposite a face side of the sliding sleeve. Specifically, this face side of the sliding sleeve is formed by a multitude of pre-synchronizer chamfers 40 which are formed on external sides, facing away from each other, of the individual teeth 42 of the internal toothing 20 of the sliding sleeve 16. As related to a radial plane, the pre-synchronizer chamfers 40 are oriented obliquely here, so that the end of the pre-synchronizer chamfers located radially further inward is closer to a center plane of the sliding sleeve 16 than the radially outer end.

In the mounted condition, the spring rings 22, 24 are therefore located within the sliding sleeve 16 (that is, closer to the center plane thereof than the sections of the sliding sleeve that define the length thereof in the axial direction) and, in addition, at the axial face sides of the hub 10 (this can be seen in particular in FIGS. 1 and 2).

Furthermore, the sliding sleeve 16 is provided with a plurality of stop teeth 44 (see in particular FIG. 10) in the region of which each of the spring rings 22, 24 is provided with a cutout 46 in the outer area. This results in a clearance with respect to the stop teeth 44. The stop teeth 44 serve to limit the maximum axial shifting travel of the sliding sleeve 16.

For synchronizing the speed change gear, a multipart synchronizer assembly is provided here, which includes the actual synchronizer ring 50 that is provided with a plurality of blocking teeth 52 on the outside, and an additional synchronizer ring 54. Both of these are coupled to the hub 10 in the circumferential direction such as to prevent relative rotation, since they have a plurality of index cams 56 engaging into recesses 34 provided in the hub 10 (see also FIG. 1). Provided within the index cam 56 is a recess 57 for engagement therein by a coupling extension 59 that is mounted to the additional synchronizer ring 54.

The recesses 57 here are in the form of cutouts open on one side.

Arranged between the synchronizer ring 50 and the additional synchronizer ring 54 is a friction ring 60 which is connected to a coupling ring 62 for joint rotation therewith (see the index cams 63). The coupling ring 62 is connected to the speed change gear 3 for joint rotation therewith and includes a friction surface 64. In this way, a multi-surface synchronization assembly, which is known per se, is formed.

On the side of the speed change gear 4, one single synchronizer ring 70 is arranged, which is also provided with blocking teeth 52 on its outside. On its inside, the synchronizer ring 70 cooperates with a friction surface 64 which is provided on a coupling ring 62 connected to the speed change gear 4 for joint rotation therewith.

The synchronizer ring 70 is also coupled to the hub 10 for joint rotation therewith. To this end, two index cams 72 are provided on the synchronizer ring and extend through two recesses 74 in the hub 10 that are located diametrically opposite each other.

Since the index cams 56, 72 of the synchronizer rings 50, 54 and 70, respectively, are arranged radially inside, it is not necessary at all to weaken or interrupt the hub 10 in the region of the external toothing 40.

When the sliding sleeve 16 is in the neutral position (see FIGS. 1 and 2), that is, neither of the two gears is shifted, it is kept in a center position by the pre-synchronizer chamfers 40 resting against the spring rings 22, 24. In this position, the synchronizer rings feature a clearance on both sides of the hub 10.

When it is intended to engage one of the gears (for example the one with the speed change gear 4), the sliding sleeve 16 is displaced in the axial direction proceeding from its position shown in FIGS. 1 and 2, i.e., in this example to the right. In the process, the sliding sleeve 16 at first entrains the spring ring 24 in the axial direction by means of the pre-synchronizer chamfers 40, the spring ring acting as a pre-synchronizer element here and acting on the synchronizer ring 70 in the axial direction until a frictional engagement occurs at the friction surface 64. The spring ring 24 can follow this movement since its spring shackles 30, 32 slide on the spring shackles 32, 30 of the spring ring 22.

The friction torque on the friction surface 64 causes the synchronizer ring 70 to be rotated relative to the hub 10 in a manner known per se, so that its blocking teeth 52 prevent the sliding sleeve 16 from shifting through prematurely. It is only when the speed of the speed change gear 4 has sufficiently approximated the speed of the gear shaft 2 and (almost) no friction torque has to be transferred by the synchronizer ring 70 anymore that the tooth tips 43 of the teeth 42 of the internal toothing 20 can rotate the blocking teeth 52 of the synchronizer ring in the circumferential direction, so that the sliding sleeve 16 can be shifted through in the axial direction so far that it comes into engagement with a coupling toothing 80 of the coupling rings 62.

In the shifting-through process, the spring rings (the spring ring 24 in the example described) can no longer follow the axial movement of the sliding sleeve 16 since they are held by the corresponding synchronizer ring. Owing to their oblique orientation, the pre-synchronizer chamfers 40 then cause the spring ring to be moved radially inward, so that it does not prevent the further movement of the sliding sleeve 16. The outer circumference of the spring ring then rests against the top lands of the teeth 42 of the internal toothing 20.

When the gear is to be disengaged again, the sliding sleeve entrains the respective spring ring in the axial direction toward the hub 10 owing to the friction between the outer circumference of the respective spring ring and the top lands of the teeth 42 of the internal toothing 20, until the spring ring rests against the hub again. As soon as the sliding sleeve has been shifted to a sufficient extent, the spring ring slides outward via the pre-synchronizer chamfers 40, so that the spring ring has its original, widened shape again. The sliding sleeve 16 is now fixed in its neutral position again.

FIGS. 12 to 16 illustrate a first variant embodiment. The same reference numbers will be used for the parts known from the first embodiment, and in this respect, reference is made to the above discussions.

In the same way as in the embodiment shown in FIGS. 1 to 11, a multipart synchronizer assembly including a synchronizer ring 50 and an additional synchronizer ring 54 is used in the first variant embodiment. The friction ring 60 is arranged between them.

The difference between the embodiment shown in FIGS. 1 to 11 and the variant embodiment according to FIGS. 12 to 16 resides in that in the variant embodiment a plurality of coupling cams 90 is provided on the additional synchronizer ring 54. Accordingly, a plurality of pockets 92 is provided on the hub 10, into which the coupling cams 90 engage such that a torque can be transmitted between the hub 10 and the additional synchronizer ring 54.

In the exemplary embodiment shown, four coupling cams 90 and, accordingly, four pockets 92 in the hub 10 are used.

Figure 14:
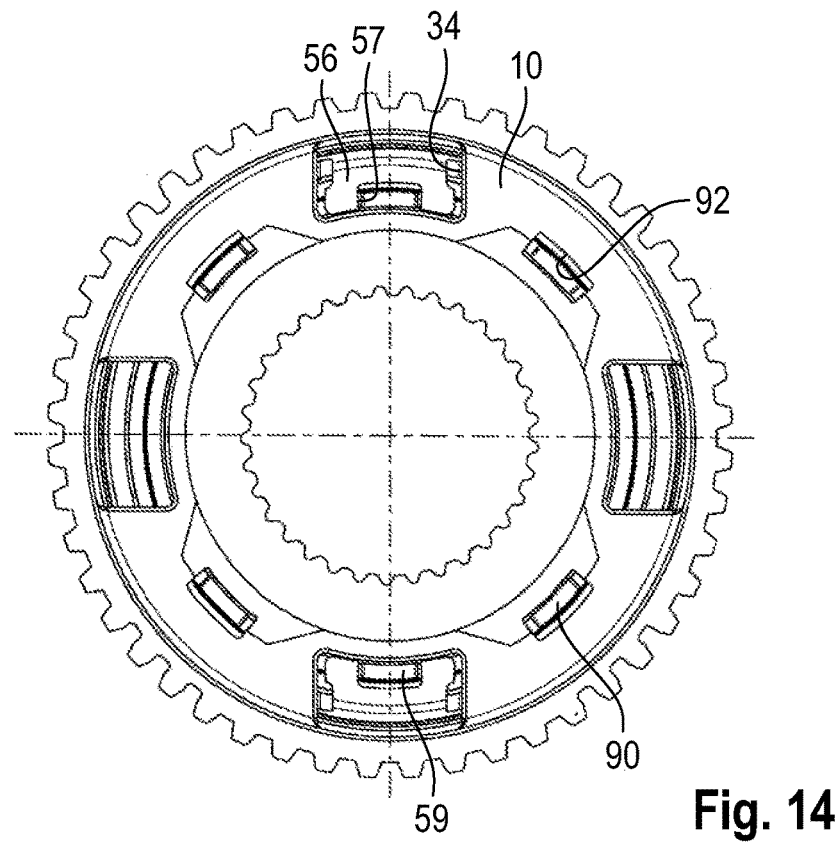
FIG. 14 shows a top view of the synchronizer unit of FIG. 12 in a neutral position.
Figure 15:
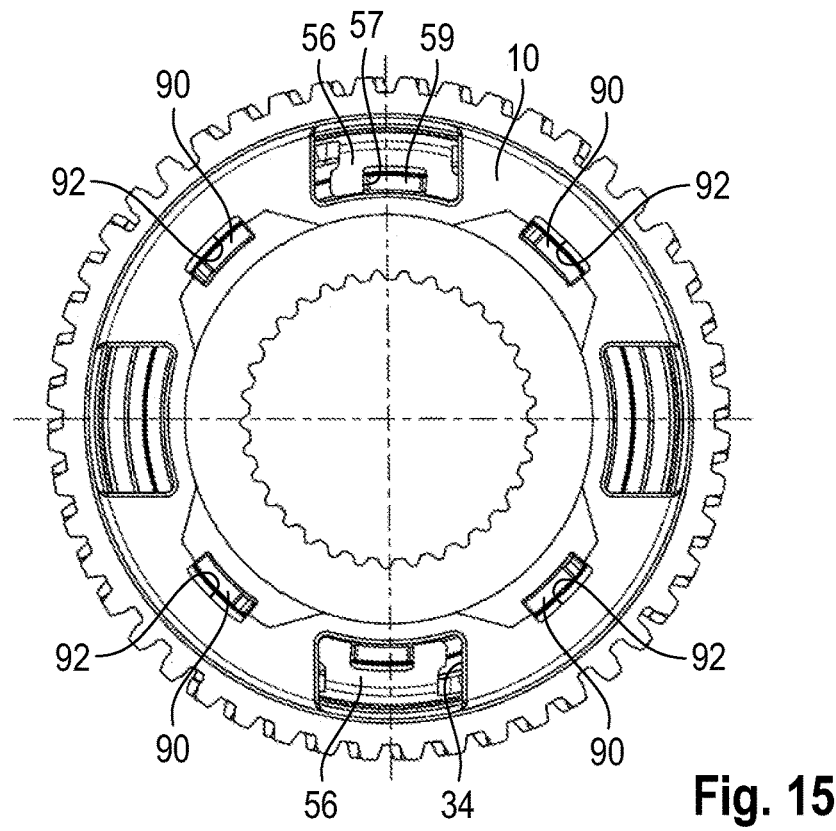
FIG. 15 shows a top view of the synchronizer unit of FIG. 12 in a pre-synchronizing position.
Figure 16:
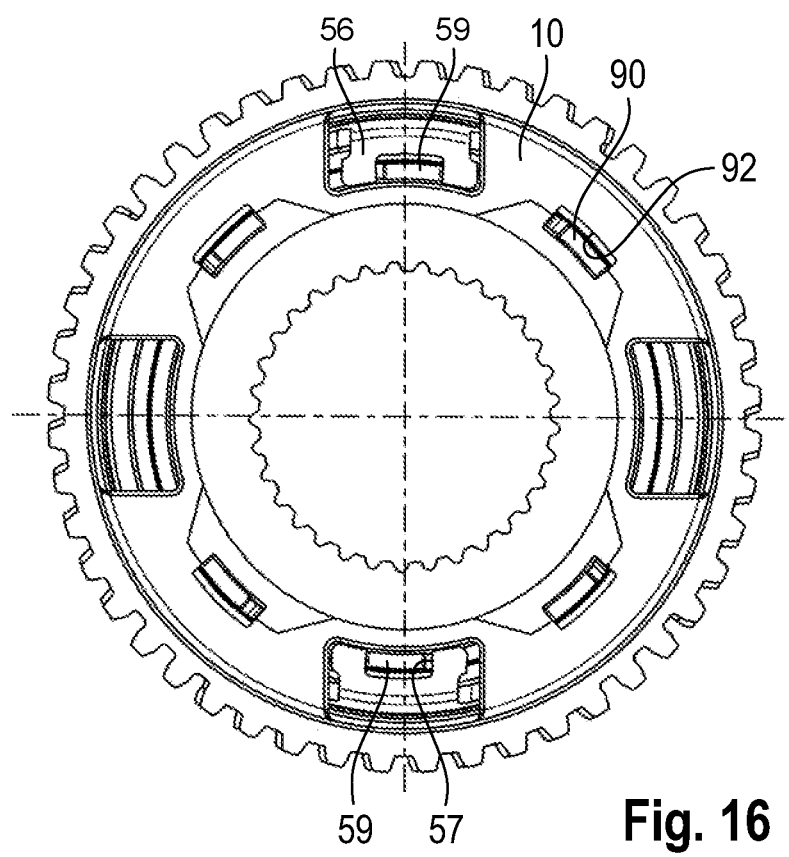
FIG. 16 shows a top view of the synchronizer unit of FIG. 12 in a blocking position.
Figure 17:
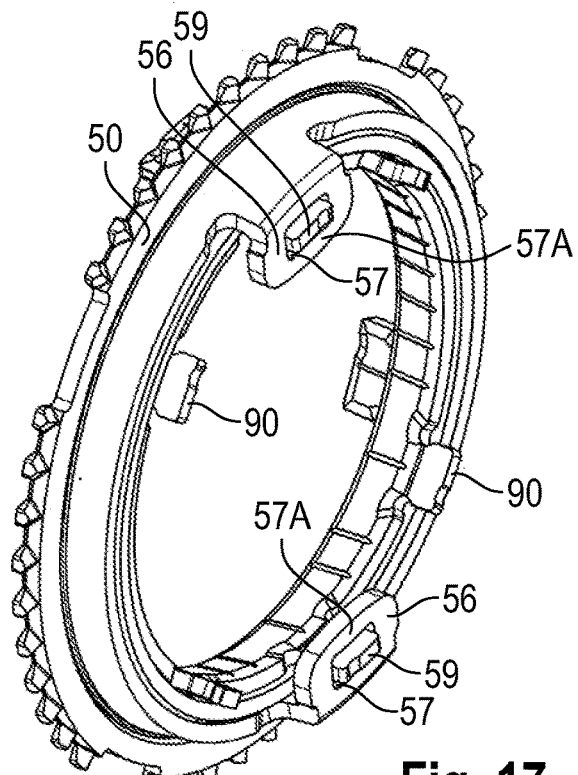
FIG. 17 shows a perspective view of a synchronizer assembly for a synchronizer unit according to a second variant embodiment.
Figure 18:
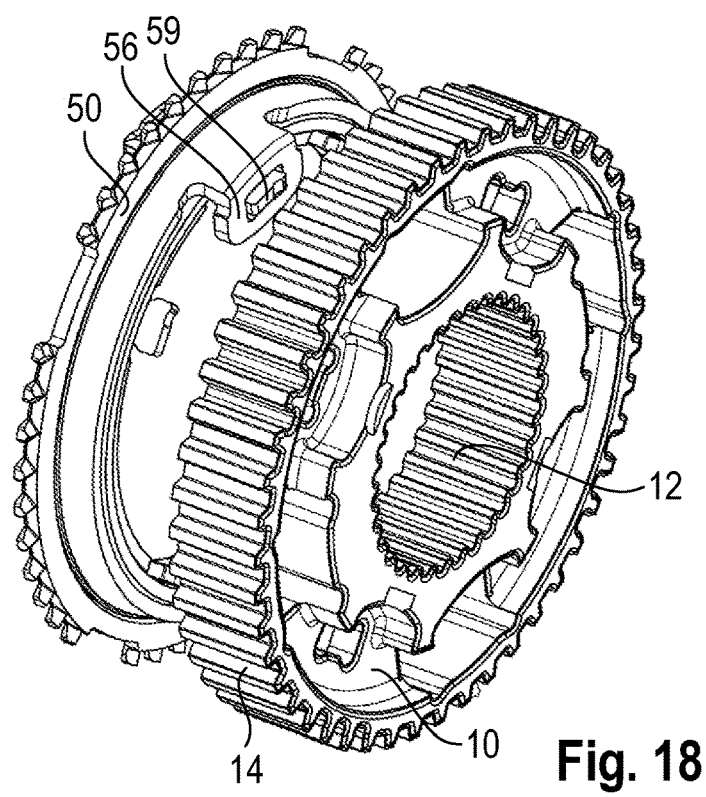
FIG. 18 shows a perspective exploded view of the synchronizer assembly of FIG. 17 together with the hub of the synchronizer unit according to the second variant embodiment.
Figure 19:
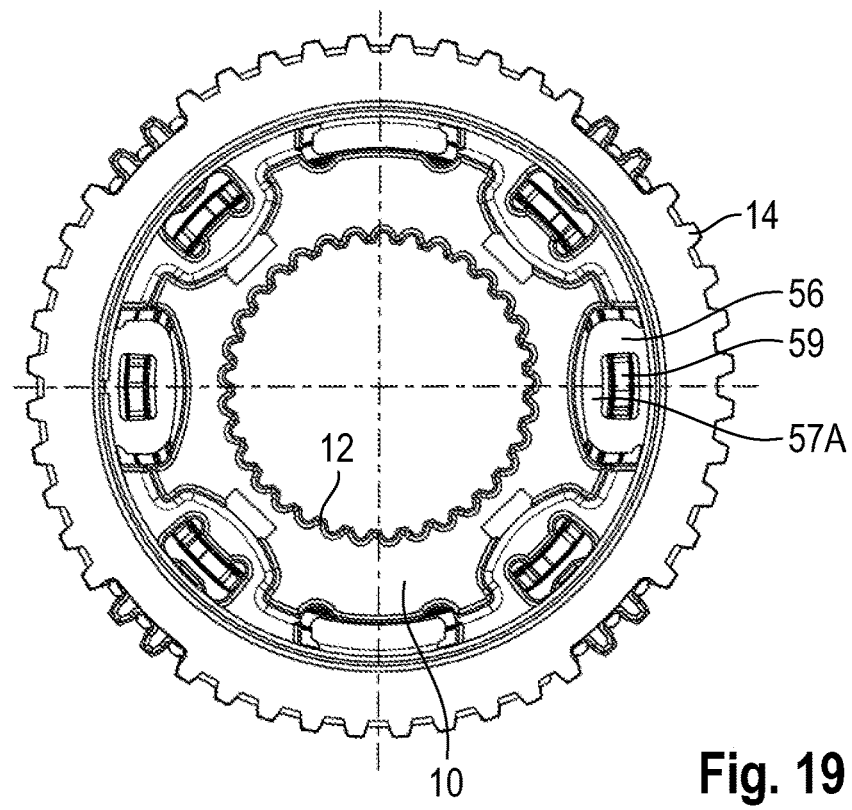
FIG. 19 shows a top view of the synchronizer unit of FIG. 18 in a neutral position.
Figure 20:
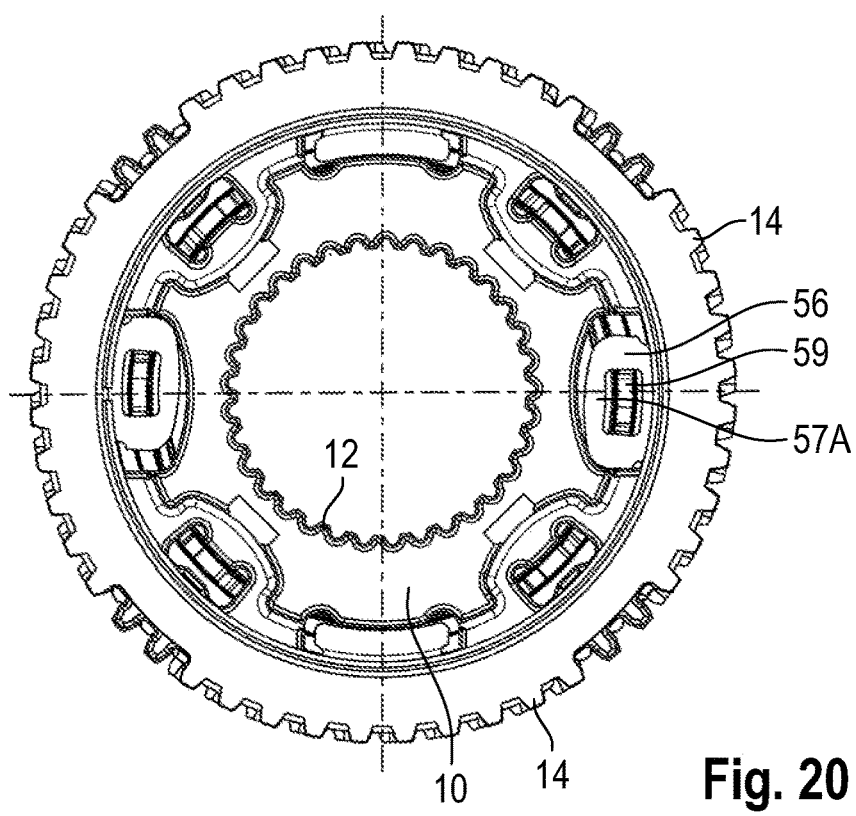
FIG. 20 shows a top view of the synchronizer unit of FIG. 18 in a pre-synchronizing position.

In the neutral position, that is, when the sliding sleeve 16 is in its center position (see FIG. 12), the synchronizer assembly having the synchronizer ring 50 and the additional synchronizer ring 54 is in the position shown in FIG. 14, in which the coupling cams 90 are arranged roughly centrally in the pockets 92 and the index cams 56 are positioned roughly centrally in the recesses 34.

When the appropriate gear is to be engaged, the synchronizer assembly is displaced in the axial direction, so that a frictional engagement with the friction surface 64 occurs. As a result, first the additional synchronizer ring 54 rotates until the coupling cams 90 rest against an edge of the corresponding pockets 92 (see FIG. 15). In this condition, however, no torque is introduced into the synchronizer ring 50 by the additional synchronizer ring 54 since there is a slight clearance S in the area of the index cams 56 (see FIG. 13). This can also be seen in FIG. 15; the coupling extension 59 is positioned centrally within the recess 57, assigned to it, of the index cam 56.

It follows from this that the torque transferred by the coupling ring 62 to the additional synchronizer ring 54 via the friction surface 64 is transferred directly into the hub 10 via the coupling cams 90 and the pockets 92.

As soon as the sliding sleeve 16 rests against the blocking teeth 52 of the synchronizer ring 50, the synchronizer ring is rotated to its blocking position (see FIG. 16), in which the coupling extensions 59 rests against the edge of the respective recesses 57 of the index cams 56. In this condition, the synchronizer ring 50 transfers part of the friction torque between the hub 10 and the coupling ring 62.

Proceeding from this condition, the further synchronization and the shifting-through are effected in the same way as in the embodiment shown in FIGS. 1 to 11.

FIGS. 17 to 20 show a second variant embodiment. The same reference numbers will be used for the parts known from the first embodiment and the first variant embodiment, and reference is made to the above discussions in this respect.

In the same way as in the first variant embodiment and the first embodiment, a multipart synchronizer assembly including a synchronizer ring 50 and an additional synchronizer ring 54 is used in the variant embodiment shown in FIGS. 17 to 20. The friction ring 60 is arranged between them.

The difference between the first variant embodiment shown in FIGS. 12 to 16 and the second variant embodiment shown in FIGS. 17 to 20 resides in that in the second variant embodiment, the recesses 57 that are provided in each index cam 56 are realized in the form of closed pockets into which the respective index cams 56 engage, rather than in the form of cutouts open on one side.

The closed, pocket-like contour of the recesses 57 is obtained by a web 57A which terminates each recess 57 on the radially inner side. As a result, a higher strength is achieved.

Figure 21:
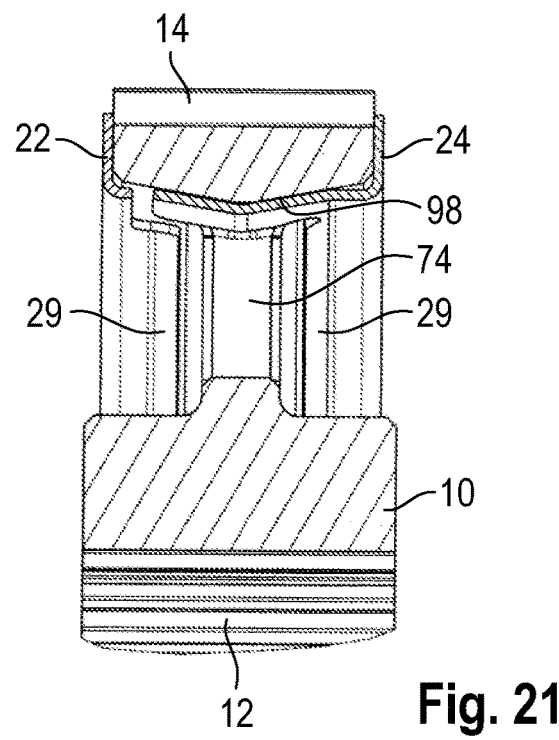
FIG. 21 shows a cut-away sectional view of a hub with spring rings according to a second embodiment attached thereto.
Figure 22:
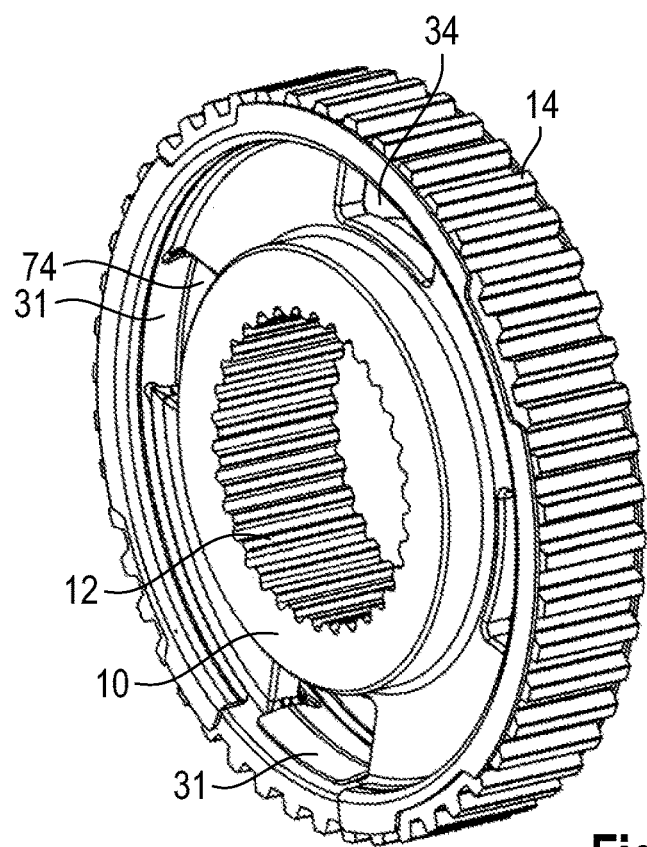
FIG. 22 shows the hub with the spring rings of FIG. 21 in a perspective view.
Figure 23:
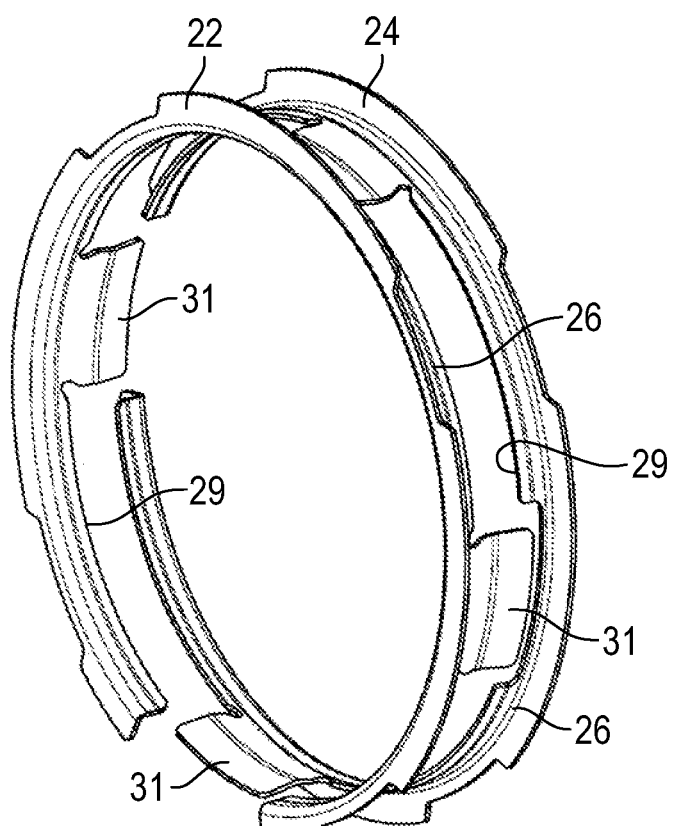
FIG. 23 shows a perspective view of the spring rings used in the second embodiment.

FIGS. 21 to 23 illustrate a second embodiment. The essential difference from the first embodiment here resides in that the two spring rings 22, 24 do not engage each other in the mounted condition, but that each spring ring 22, 24 is mounted to the hub 10 independently of the other spring ring 24, 22. For this purpose, each spring ring 22, 24 includes two spring shackles 31 which, viewed in a cross-section, have the shape of a very shallow V (see in particular FIG. 23). The concave inner surface of this "V" rests against a spring ring holding surface 98 which is located on the radially outer side of the recess 34 formed on the radially outer side of the recesses 74 of the hub 10.

When, starting from the neutral position, the sliding sleeve 16 is displaced and the spring ring 22, 24 is entrained in the axial direction in the process, the spring shackles 31 of the respective spring ring 22, 24 slide on the spring ring holding surface 98, the spring shackles 31 being elastically moved radially inward here. This produces a pretension which assists the spring rings 22, 24 to return to the initial position shown in FIG. 23 when the respective gear is disengaged.

A further difference between the first and second embodiments resides in that in the second embodiment, the step 26 by which the spring rings are fixed in place at the hub 10 in the axial direction and in the circumferential direction are formed by a circumferential guide collar 29 here.

The invention claimed is:

1. A synchronizer unit for a manual transmission, comprising a hub which is adapted to be connected to a gear shaft for joint rotation therewith and includes a circumferentially continuous external toothing, a sliding sleeve which is received on the external toothing of the hub for displacement in the axial direction, but so as to be coupled in the circumferential direction to prevent relative rotation, at least one synchronizer ring which includes a friction surface for friction coupling of the synchronizer ring to a speed change gear of the manual transmission and is adapted to be actuated by the sliding sleeve, and a spring ring which is arranged at an axial side of the external toothing of the hub and is configured to lock the sliding sleeve in a neutral position, wherein the spring ring rests against a face side of the sliding sleeve and is operatively arranged between the sliding sleeve and the synchronizer ring, and includes at least one guide step by means of which it is guided at the hub in the axial direction and in the circumferential direction.

2. The synchronizer unit of claim 1 wherein the spring ring is a reshaped sheet metal ring.

3. The synchronizer unit of claim 1 wherein the spring ring is circumferentially interrupted.

4. The synchronizer unit of claim 1 wherein in the neutral position of the sliding sleeve, the spring ring rests against an internal toothing of the sliding sleeve.

5. The synchronizer unit of claim 4 wherein the internal toothing of the sliding sleeve is circumferentially continuous.

6. The synchronizer unit of claim 1 wherein the spring ring serves as a pre-synchronizer element.

7. The synchronizer unit of claim 1 wherein the guide step is formed by a circumferential, reshaped guide collar.

8. The synchronizer unit of claim 1 wherein the guide step includes a plurality of substantially axially extending guide tabs.

9. A synchronizer unit for a manual transmission, comprising a hub which is adapted to be connected to a gear shaft for joint rotation therewith and includes a circumferentially continuous external toothing, a sliding sleeve which is received on the external toothing of the hub for displacement in the axial direction, but so as to be coupled in the circumferential direction to prevent relative rotation, at least one synchronizer ring which includes a friction surface for friction coupling of the synchronizer ring to a speed change gear of the manual transmission and is adapted to be actuated by the sliding sleeve, and a spring ring which is arranged at an axial side of the external toothing of the hub and is configured to lock the sliding sleeve in a neutral position, wherein the spring ring rests against a face side of the sliding sleeve and is operatively arranged between the sliding sleeve and the synchronizer ring, and comprises two or more substantially axially extending spring shackles which each engage in a recess provided in the hub.

10. The synchronizer unit of claim 9 wherein the spring shackle comprises a portion that is bent or angled radially outward.

11. The synchronizer unit of claim 9 wherein in the neutral position, the spring shackle rests against a spring ring holding surface of the hub, the spring ring holding surface.

12. The synchronizer unit of claim 11 wherein the spring shackle engages behind the spring ring holding surface in the axial direction.

13. The synchronizer unit of claim 9 wherein two spring rings are provided which are arranged on axially opposite sides of the hub.

14. The synchronizer unit of claim 13 wherein the two spring rings do not contact each other.

15. The synchronizer unit of claim 13 wherein the spring shackles of the two spring rings arranged on axially opposite sides of the hub radially rest against each other in pairs.

16. The synchronizer unit of claim 15 wherein the spring rings resting against each other in pairs engage behind each other in the axial direction.

17. The synchronizer unit of claim 1 wherein a synchronizer assembly having the synchronizer ring and an additional synchronizer ring is provided, the synchronizer ring being provided with at least one index cam which has a recess having a coupling extension received therein which is mounted to the additional synchronizer ring.

18. The synchronizer unit of claim 17 wherein the additional synchronizer ring is provided with at least one coupling cam which engages in a pocket provided at the hub.

19. The synchronizer unit of claim 17 wherein the recess is configured as a closed pocket.

* * * * *